(12) United States Patent
Patwardhan

(10) Patent No.: US 7,596,566 B1
(45) Date of Patent: Sep. 29, 2009

(54) SYSTEM AND METHOD FOR FLEXIBLE HANDLING OF RULES AND REGULATIONS IN LABOR HIRING

(75) Inventor: Shantanu Patwardhan, Cupertino, CA (US)

(73) Assignee: Rearden Commerce, Inc., Foster City, CA (US)

( * ) Notice: Subject to any disclaimer, the term of this patent is extended or adjusted under 35 U.S.C. 154(b) by 342 days.

(21) Appl. No.: 11/066,022

(22) Filed: Feb. 24, 2005

(51) Int. Cl.
*G06F 7/00* (2006.01)

(52) U.S. Cl. .......................................... 707/10; 705/11
(58) Field of Classification Search ................. 707/1–10, 707/200; 705/4, 8, 10, 11
See application file for complete search history.

(56) References Cited

U.S. PATENT DOCUMENTS

| | | | |
|---|---|---|---|
| 5,191,523 A | 3/1993 | Whitesage |
| 5,319,542 A | 6/1994 | King et al. |
| 5,331,546 A | 7/1994 | Webber et al. |
| 5,475,740 A | 12/1995 | Biggs et al. |
| 5,570,283 A | 10/1996 | Shoolery et al. |
| 5,655,008 A | 8/1997 | Futch et al. |
| 5,819,092 A | 10/1998 | Ferguson et al. |
| 5,832,451 A | 11/1998 | Flake et al. |
| 5,839,114 A | 11/1998 | Lynch et al. |
| 5,852,812 A | 12/1998 | Reeder |
| 5,893,077 A | 4/1999 | Griffin |
| 5,897,620 A | 4/1999 | Walker et al. |
| 6,018,715 A | 1/2000 | Lynch et al. |
| 6,023,679 A | 2/2000 | Acebo et al. |
| 6,195,420 B1 | 2/2001 | Tognazzini |
| 6,230,204 B1 | 5/2001 | Fleming |
| 6,295,521 B1 | 9/2001 | DeMarcken et al. |
| 6,304,850 B1 | 10/2001 | Keller et al. |
| 6,411,940 B1 | 6/2002 | Egendorf |
| 6,442,526 B1 | 8/2002 | Vance et al. |
| 6,477,520 B1 | 11/2002 | Malaviya et al. |
| 6,571,213 B1 | 5/2003 | Altendahl et al. |

(Continued)

FOREIGN PATENT DOCUMENTS

CA 2291463 6/2001

(Continued)

OTHER PUBLICATIONS

Gertsbakh, Ilya et al., "Periodic transportation schedules with flexible departure time. An interactive approach based on the period event scheduling program and the deficit function approach," European Journal of Operational Research, Feb. 15, 1991, pp. 298-309, ScienceDirect, Nov. 3, 2008 <http://www.sciencedirect.com/science/article/B6VCT>.

(Continued)

*Primary Examiner*—Wilson Lee
(74) *Attorney, Agent, or Firm*—Greenberg Traurig, LLP

(57) ABSTRACT

A method and system are described for flexible handling of rules and regulations in labor hiring, comprising of receiving a requisition form from a computing device, at least partially completed by a requestor; automatically performing a rules check on the requisition form; in response to a field entry on the form violating a predefined rule, returning the requisition form to the requester to correct or providing the requisition form to a supervisor to override a field entry violating a predefined rule; and in response to no field entry on the form violating a predefined rule, transmitting the form to a service provider.

10 Claims, 3 Drawing Sheets

U.S. PATENT DOCUMENTS

| | | |
|---|---|---|
| 6,622,084 B2 | 9/2003 | Cardno et al. |
| 6,715,073 B1 * | 3/2004 | An et al. .................... 713/156 |
| 6,816,882 B1 | 11/2004 | Conner et al. |
| 6,839,679 B1 | 1/2005 | Lynch et al. |
| 6,847,988 B2 | 1/2005 | Toyouchi et al. |
| 6,959,298 B1 | 10/2005 | Silverbrook et al. |
| 6,961,773 B2 | 11/2005 | Hartman et al. |
| 6,965,868 B1 | 11/2005 | Bednarek |
| 6,980,885 B2 | 12/2005 | Ye et al. |
| 7,080,096 B1 | 7/2006 | Imamura |
| 7,117,170 B1 | 10/2006 | Bennett et al. |
| 7,136,821 B1 | 11/2006 | Kohavi et al. |
| 7,139,728 B2 | 11/2006 | Rigole |
| 7,222,084 B2 | 5/2007 | Archibald et al. |
| 7,272,568 B1 | 9/2007 | Birch et al. |
| 7,272,626 B2 | 9/2007 | Sahai et al. |
| 7,315,824 B2 | 1/2008 | Chen et al. |
| 2002/0010612 A1 | 1/2002 | Smith et al. |
| 2002/0016729 A1 | 2/2002 | Breitenbach et al. |
| 2002/0103693 A1 | 8/2002 | Bayer et al. |
| 2002/0120478 A1 | 8/2002 | Tanaka |
| 2002/0156687 A1 | 10/2002 | Carr et al. |
| 2003/0036930 A1 | 2/2003 | Matos et al. |
| 2003/0036981 A1 | 2/2003 | Vaughan et al. |
| 2003/0040987 A1 | 2/2003 | Hudson et al. |
| 2003/0078800 A1 | 4/2003 | Salle et al. |
| 2003/0105711 A1 | 6/2003 | O'Neil |
| 2003/0110062 A1 | 6/2003 | Mogler et al. |
| 2003/0110136 A1 | 6/2003 | Wells et al. |
| 2003/0120477 A1 | 6/2003 | Kruk et al. |
| 2003/0120526 A1 | 6/2003 | Altman et al. |
| 2003/0182413 A1 | 9/2003 | Allen et al. |
| 2003/0200111 A1 | 10/2003 | Damji |
| 2003/0204474 A1 | 10/2003 | Capek et al. |
| 2003/0229529 A1 * | 12/2003 | Mui et al. .................... 705/8 |
| 2003/0236722 A1 | 12/2003 | Kamel |
| 2004/0044556 A1 | 3/2004 | Brady et al. |
| 2004/0044600 A1 | 3/2004 | Chu et al. |
| 2004/0044644 A1 | 3/2004 | Brady et al. |
| 2004/0044673 A1 | 3/2004 | Brady et al. |
| 2004/0044681 A1 | 3/2004 | Brady et al. |
| 2004/0049413 A1 | 3/2004 | Momma et al. |
| 2004/0073615 A1 | 4/2004 | Darling |
| 2004/0117275 A1 | 6/2004 | Billera |
| 2004/0143498 A1 | 7/2004 | Umeda |
| 2004/0153348 A1 | 8/2004 | Garback |
| 2004/0167808 A1 | 8/2004 | Fredericks et al. |
| 2004/0193457 A1 | 9/2004 | Shogren |
| 2004/0210487 A1 | 10/2004 | Fujimoto et al. |
| 2004/0249684 A1 | 12/2004 | Karppinen |
| 2004/0260601 A1 * | 12/2004 | Brief .................... 705/11 |
| 2004/0260603 A1 | 12/2004 | Marmotta |
| 2005/0004830 A1 | 1/2005 | Rozell et al. |
| 2005/0043996 A1 | 2/2005 | Silver |
| 2005/0060271 A1 | 3/2005 | Vig |
| 2005/0065821 A1 | 3/2005 | Kalies |
| 2005/0108069 A1 | 5/2005 | Shiran et al. |
| 2005/0119809 A1 | 6/2005 | Chen |
| 2005/0120052 A1 | 6/2005 | Miller et al. |
| 2005/0132006 A1 | 6/2005 | Horvitz et al. |
| 2005/0138175 A1 * | 6/2005 | Kumar et al. .................... 709/226 |
| 2005/0165629 A1 | 7/2005 | Bruns |
| 2005/0197915 A1 | 9/2005 | Biwer et al. |
| 2005/0216375 A1 | 9/2005 | Grendel et al. |
| 2005/0273345 A1 | 12/2005 | Castillejo |
| 2005/0283389 A1 | 12/2005 | Widjaja et al. |
| 2006/0010023 A1 | 1/2006 | Tromczynski et al. |
| 2006/0037016 A1 * | 2/2006 | Saha et al. .................... 717/178 |
| 2006/0100909 A1 * | 5/2006 | Glimp et al. .................... 705/3 |
| 2006/0101467 A1 * | 5/2006 | Buco et al. .................... 718/102 |
| 2006/0123088 A1 | 6/2006 | Simmons et al. |
| 2006/0143087 A1 | 6/2006 | Tripp et al. |
| 2006/0190314 A1 | 8/2006 | Hernandez |
| 2006/0212321 A1 | 9/2006 | Vance et al. |
| 2006/0224423 A1 | 10/2006 | Sun et al. |
| 2006/0283935 A1 | 12/2006 | Henry et al. |
| 2007/0005406 A1 | 1/2007 | Assadian et al. |
| 2007/0174154 A1 | 7/2007 | Roberts et al. |
| 2007/0239548 A1 | 10/2007 | Sears |
| 2008/0004964 A1 | 1/2008 | Messa |
| 2008/0065408 A1 | 3/2008 | Salonen |
| 2008/0091481 A1 | 4/2008 | Messa |
| 2009/0006142 A1 | 1/2009 | Orttung |

OTHER PUBLICATIONS

Website: "Tax Consequences of Frequent Flyer Mileage Earned on Business Travel", <http://www.ssbb.com/freqfly.html>, Satterlee Stephens Burke & Burke LLP, May 1997, printed Nov. 3, 2008.

* cited by examiner

SYSTEM AND METHOD FOR FLEXIBLE HANDLING OF RULES AND REGULATIONS IN LABOR HIRING

FIELD OF THE INVENTION

This invention relates generally to procurement of services, and more particularly to coordinating the group procurement of services.

BACKGROUND OF THE INVENTION

When someone in an enterprise or other similar organization needs to hire temporary labor, particularly under great time pressure, often a suitable candidate cannot be found in time. Suitability, in such cases, may be defined in terms of qualifications to perform the work, or agreeing to meet corporate guidelines about the hourly rate or the hours of work, or in meeting any of a multitude of corporate hiring guidelines. These guidelines are usually embedded in the systems, where available, making the systems complex to use. An example of the complexity is that the approval of the hiring request becomes a multi-step process with iterative changes to requirements and takes a long time. Often, due to complexity of usage and increased cycle time of the systems, hiring personnel in an organization end up circumventing the system to be able to hire a person they desperately need to continue running their business or completing a project. Current hiring systems in these organizations thus may actually undermine corporate policies and create an atmosphere in which hiring personnel feel it necessary and right to work around rules.

What is clearly needed is a system and method that allows hiring personnel, in certain situations, particularly in the hiring of temporary labor, to automatically apply corporate hiring guidelines, notify the user when he is violating policies, and then allow him to flexibly override certain labor procurement procedures and corporate labor rules and policies.

SUMMARY OF THE INVENTION

One embodiment of the invention includes a method and system for flexible handling of rules and regulations in labor hiring, comprising of receiving a requisition form from a computing device, at least partially completed by a requestor; automatically performing a rules check on the requisition form; in response to a field entry on the form violating a predefined rule, returning the requisition form to the requestor to correct or providing the requisition form to a supervisor to override a field entry violating a predefined rule; and in response to no field entry on the form violating a predefined rule, transmitting the form to a service provider.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
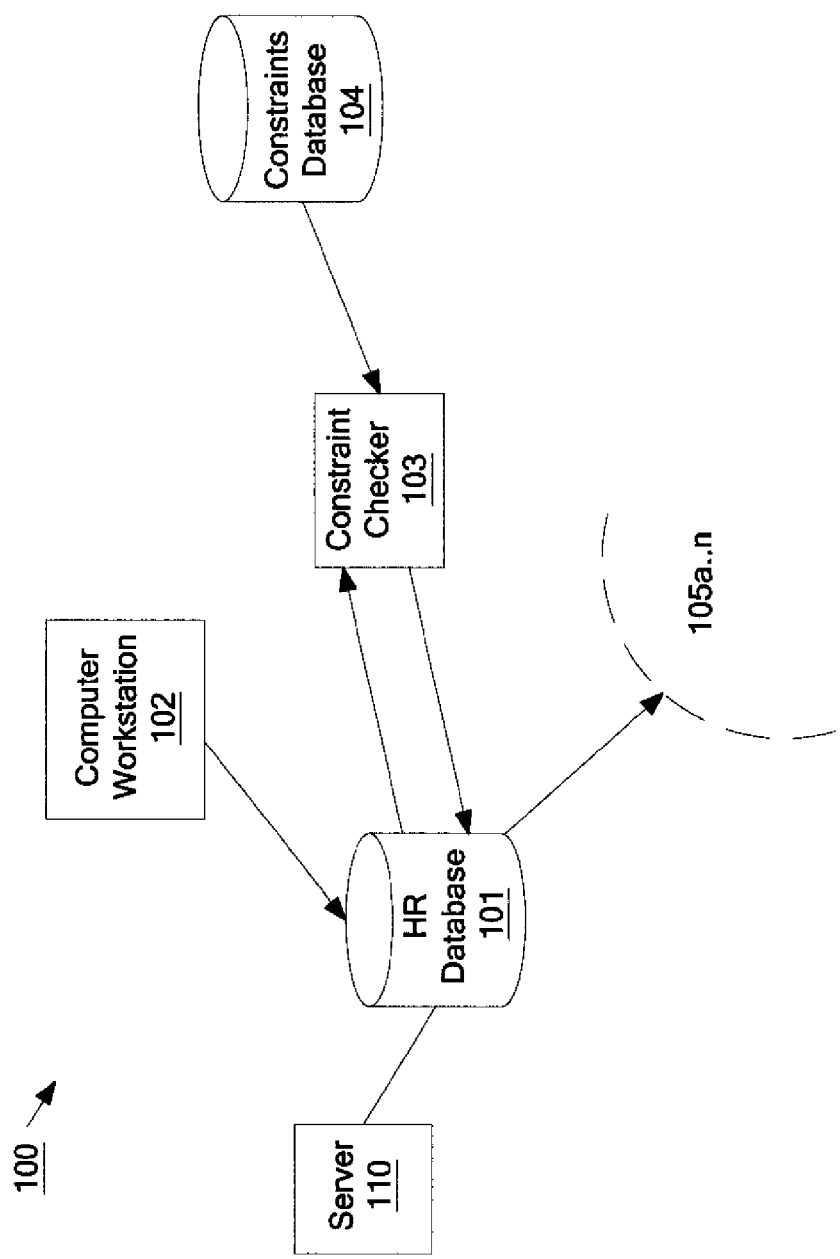
FIG. 1 shows a partial overview of a flexible labor procurement system 100 according to one embodiment.

FIG. 1 shows a partial overview of a flexible labor procurement system 100 according to one embodiment. Server 110 is a computer or server in the network. It is clear that in many cases more than one such server 110 may exist, but for purposes of simplicity and clarity in FIG. 1, only one such server 110 is shown. This server also may be used for other systems. For example, it may be integrated with a services procurement system as described in U.S. patent application Ser. No. 11/093,353, filed Mar. 29, 2005 and U.S. patent application Ser. No. 11/096,635, filed Mar. 31, 2005, both of which are entitled Method and System for Anonymous Resale of Inventory and Profit-Making from Sale of Unused Inventory, and both of which are incorporated herein by reference. However, in other cases server 110 could be dedicated only to the single function of the novel art of this disclosure, or in yet other cases, it could be integrated with some other types of systems, either as a separate module or as a fully integrated feature.

Database 101 contains the human resources data of the system, including, but not limited to, both the rules for hourly rates, benefits, permissions, etc., as well as corporate policies regarding the qualifications of workers and other applicable aspects of hiring labor. A person requiring temporary labor would fill out an electronic hiring requisition form available at computer workstation 102. This form would then be processed through a rule and constraint checker 103. Checker 103 may have its own rules and constraints database 104, or it may rely on the human resources databases 101, or on both databases. Then after the processing is finished, the request may be sent to some or many temporary service providers 105a-n. In other cases, the request may be sent to a services exchange system as described in U.S. patent application Ser. No. 11/093,353, filed Mar. 29, 2005 and U.S. patent application Ser. No. 11/096,635, filed Mar. 31, 2005, both of which are entitled Method and System for Anonymous Resale of Inventory and Profit-Making from Sale of Unused Inventory, and both of which are incorporated herein by reference.

Figure 2:
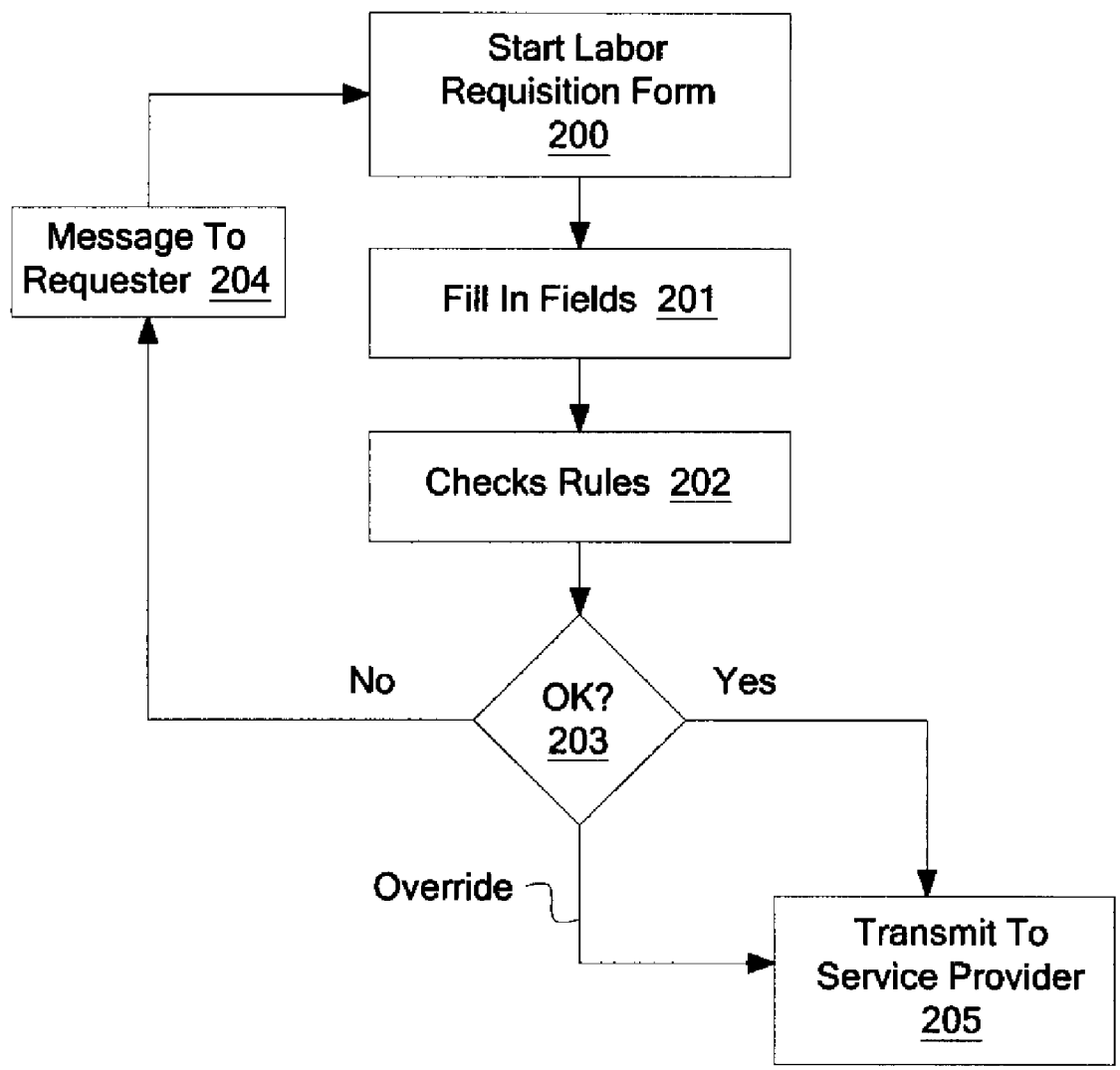
FIG. 2 shows a diagram of the procedure for completing and processing a hiring requisition in accordance with one embodiment.

FIG. 2 shows a simplified diagram of the procedure for completing and processing a hiring requisition. The person requesting the temporary labor opens standard requisition form 200 at a computer workstation, as described above in the discussion of FIG. 1, and fills in standard fields in step 201. If the requestor enters any field values that are non-compliant with requisition rules or with the corporate rules, said values may still be accepted by the form, but may be marked to highlight and/or distinguish them, for example, in a special color. Once the rules check is completed in step 202 (using rules and constraints engine 103), final review is done in step 203. If certain rules are violated, the requisition is rejected and sent back in step 204 to the requestor or to his supervisor, either for amendment and/or to override instructions. If, in step 203, the rules are met and the form is approved, the completed form 200 is then passed on in step 205 for transmission to service providers. If a re-application or an override has occurred, then in step 203 the override causes the application to immediately continue to transmission to a service provider in step 205.

Figure 3:
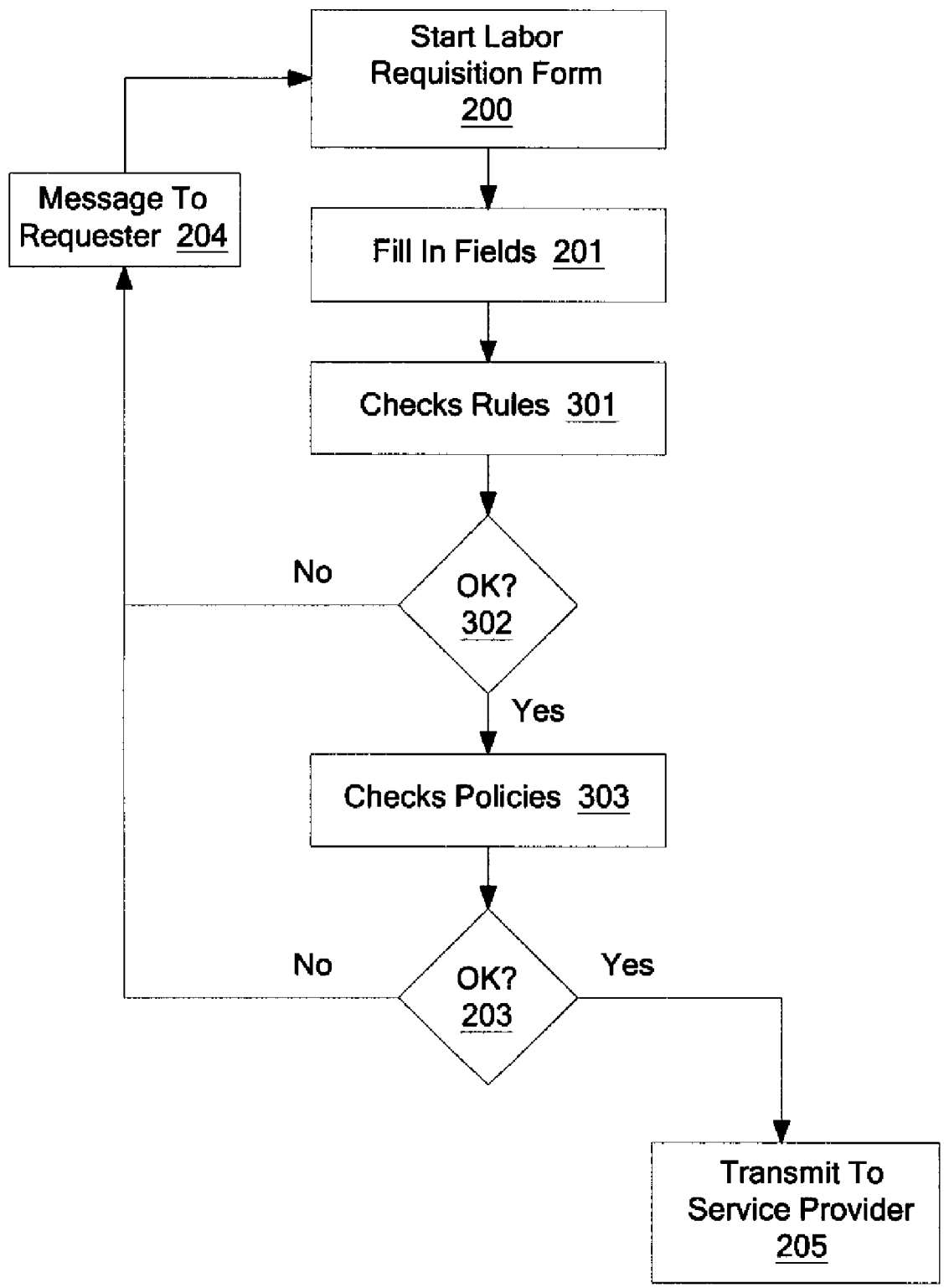
FIG. 3 shows a diagram of the procedure for completing and processing a hiring requisition in accordance with an alternative embodiment.

FIG. 3 shows an alternative embodiment, in which, after the requestor opens standard from 200 and fills in the fields in step 201, a rules check is made of the requisition rules in step 301. If noncompliance with the rules is discovered, in step 204 the system may send a request for an override message to the requester or in some cases to his supervisor. Once this hurdle is cleared with an override or a modification, the requisition receives an approval in step 302, and then in step 303 it undergoes a second separate check for corporate policies, etc. Once the requisition receives an approval in step 203, it goes to step 205. Alternatively, the requisition may be rejected. It then goes back via step 204 for amendment by the requestor or an override by a supervisor, in this case probably a different supervisor, because the same person usually does not have authorization to override both the requisition rules and the corporate or human resources policies.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EE-PROM's); and electrical, optical, acoustical and other forms of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A method comprising:
    receiving a labor requisition form from a computing device, at least partially completed by a requester requesting at least temporary labor support be provided to the requestor;
    automatically performing a rules check on the labor requisition form using at least one rule of requisition rules and corporate rules associated with an employer of the requestor;
    in response to the labor requisition form violating any of the at least one rule, returning the labor requisition form to the requester to notify the requestor of one or more violations of the at least one rule and sending a request for an override message to the requester; and
    in response to the override message from the requestor, automatically accepting the labor requisition form having the one or more violations and transmitting the labor requisition form to a temporary labor service provider for the temporary labor support requested by the requestor.

2. The method of claim 1, wherein the labor requisition form comprises field entries, the method further comprising accepting, displaying and highlighting field entries that violate at least one rule.

3. The method of claim 1, wherein the automatically performing the rules check is performed by a rules and constraint engine.

4. The method of claim 2, wherein the highlighting includes coloring the respective violating field entry in a color distinguished from a field entry that is not violating any of the at least one rule.

5. The method of claim 1, further comprising after the accepting of the labor requisition form that violates the at least one rule, automatically performing a second check on the labor requisition form, using a computer, in view of corporate policies.

6. The method of claim 5, further comprising: in response to a field entry on the labor requisition form violating a corporate policy, providing the labor requisition form to a supervisor of the requestor for an override to accept the field entry violating a corporate policy.

7. A machine readable medium having stored thereon a set of instructions which, when executed by a processor, cause the processor to perform a method comprising:
    receiving a labor requisition form from a computing device, at least partially completed by a requester requesting at least temporary labor support be provided to the requestor;
    automatically performing a rules check on the labor requisition form using at least one rule of requisition rules and corporate rules associated with an employer of the requestor;
    in response to the labor requisition form violating any of the at least one rule, returning the labor requisition form to the requester to notify the requestor of one or more violations of the at least one rule and sending a request for an override message to the requester; and
    in response to the override message from the requester, automatically accepting the labor requisition form and transmitting the labor requisition form to a temporary labor service provider for the temporary labor support requested by the requestor.

8. The machine readable medium of claim 7, wherein the method further comprises: accepting, displaying and highlighting field entries entered on the labor requisition form that violate the at least one rule, as a respective entry is entered on the labor requisition form.

9. A system comprising:
    a processor; and
    a memory coupled to the processor the memory storing instructions to cause the processor to:
        receive a labor requisition form from a computing device, at least partially completed by a requestor requesting at least temporary labor support be provided to the requester;
        automatically perform a rules check on the labor requisition form using at least one rule of requisition rules and corporate rules associated with an employer of the requestor;

return the labor requisition form to the requester to notify the requester of one or more violations of the at least one rule and send a request for an override message to the requester, in response to the labor requisition form violating any of the at least one rule; and automatically accept the labor requisition form and transmit the labor requisition form to a temporary labor service provider, in response to the override message from the requestor.

10. The system of claim 9, wherein the processor is to automatically perform a second check on the requisition form in view of corporate policies.

* * * * *